Nov. 20, 1956 H. C. DOANE 2,770,971
FLYWHEEL, CLUTCH AND STARTER HOUSING DRAIN
Filed Dec. 7, 1951 3 Sheets-Sheet 2

Inventor
Harry C. Doane
By Willits, Helmig & Caillis
Attorneys

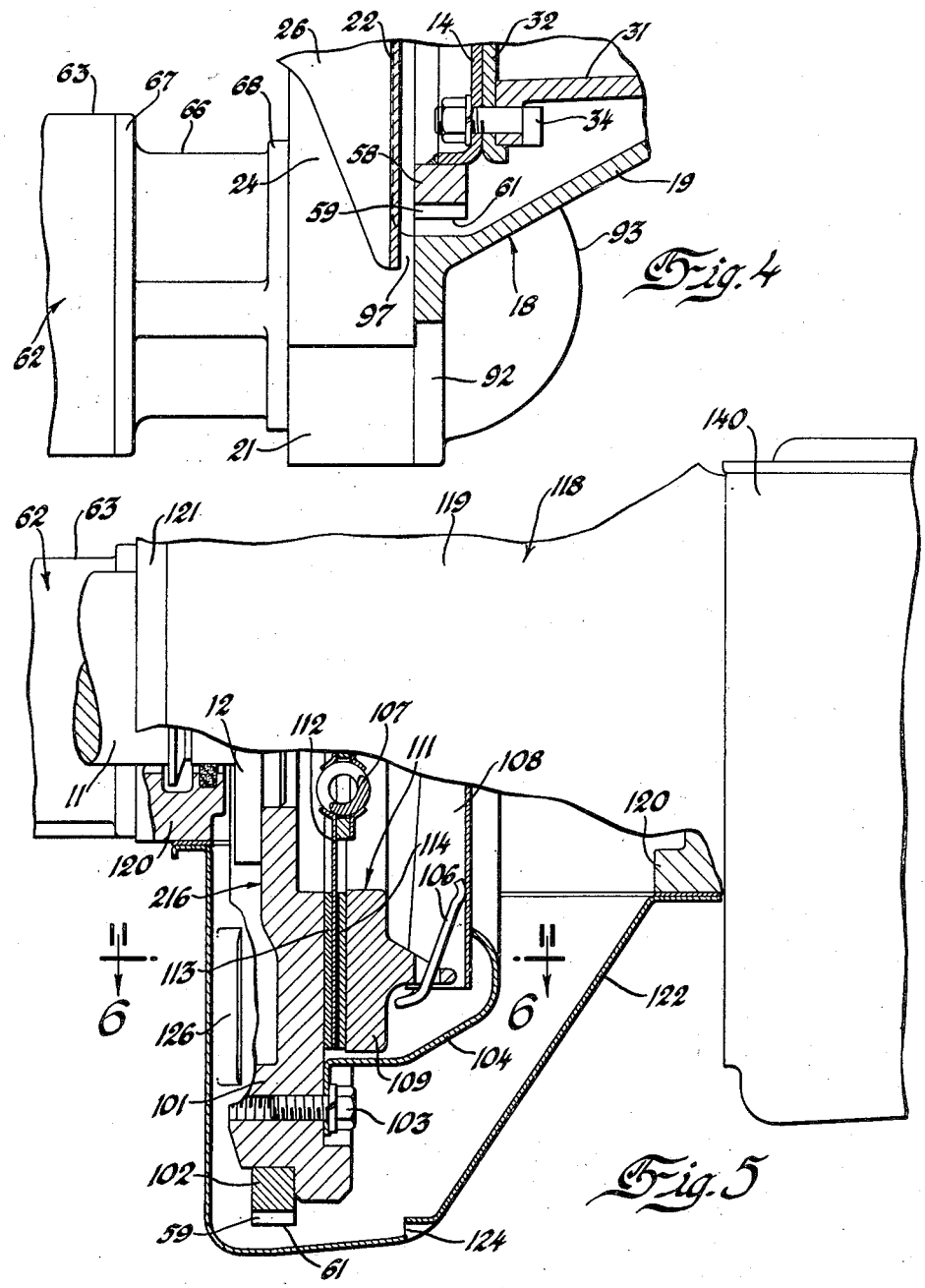

United States Patent Office 2,770,971
Patented Nov. 20, 1956

2,770,971

FLYWHEEL, CLUTCH AND STARTER HOUSING DRAIN

Harry C. Doane, Flint, Mich., assignor to General Motors Corporation, Detroit, Mich., a corporation of Delaware Application December 7, 1951, Serial No. 260,419

5 Claims. (Cl. 74—6)

This invention relates to the draining of oil, water and other objectionable fluids from the flywheel, clutch and starter mechanism housings of engines employed in driving automotive vehicles or for other purposes.

It is difficult to seal the flywheel and clutch housing of an automobile or other engine in such a way as to prevent the admission thereto of water, sand, dirt, slush and other objectionable fluids or substances thereto. If such a housing could be sealed against extraneous matter of this kind, it would still be desirable to provide a drain opening in the bottom of the housing to prevent the accumulation therein of oil and other fluid substances which may seep through the bearings at the front and rear ends of the housing and through which the driven shaft of the engine projects. Such accumulations of liquids are objectionable for many reasons, particularly where dry disc friction clutches are employed for operating the driven shaft or transmission with which such engines may be provided.

It is now conventional practice to attach the starter for the engine to the flywheel housing, the starter casing being in communication with the flywheel casing or housing through an opening through which the starter pinion projects into engagement with the ring gear attached to the rotatable flywheel and clutch member within the housing. Water and other objectionable fluids and substances may leak into the starter casing or may enter the starter casing as a result of accumulations which may be picked up by the flywheel and ring gear and projected into the starter casing through the pinion opening through which the casing and housing are in open communication. The starter mechanism may be damaged by such objectionable liquids and substances regardless of how these may enter the starter casing. Under such circumstances, the starter mechanism may become inoperative due to the short circuiting of the windings therein or to freezing of the starter mechanism or the control means therefor. It might be suggested that a drain hole be provided in the lower part of the starter mechanism casing but this has been tried and it has been found not to be desirable because such a drain opening also provides an additional means by which water and other objectionable substances may enter the starter casing.

It is now proposed to construct a starter casing in such a way that it will drain into the flywheel and clutch housing and then to provide centrifugal pumping means in the flywheel and clutch housing to forcibly exhaust any objectionable fluids and substances that may collect therein and which may result from internal leakage or from leakage through the starter casing or flywheel housing.

In the present instance the centrifugal pump employed is provided by the rotating flywheel member and the housing therefor merely by constructing the two in such manner that accumulated fluid within the flywheel housing will be pumped out of the housing by operation of the engine.

In the drawings:

Figure 3 is taken substantially in the plane of line 3—3 on Figure 2, looking in the direction of the arrows thereon.

Figure 4 is another fragmentary view of the structure shown by the preceding figures. Figure 4 is taken substantially in the plane of line 4—4 on Figure 2, looking in the direction of the arrows thereon.

Figure 5 is a fragmentary elevational view of an engine illustrating another form which the invention may assume. Figure 5 has parts thereof broken away to illustrate in cross section the application of the invention to a dry disc clutch and flywheel type of drive mechanism with which the engine may be provided.

Figure 6 is a cross sectional view of a part of the lower section of the flywheel housing employed in the structure illustrated by Figure 5. Figure 6 is taken substantially in the plane of line 6—6 on Figure 5, looking in the direction of the arrows thereon.

Figure 1:
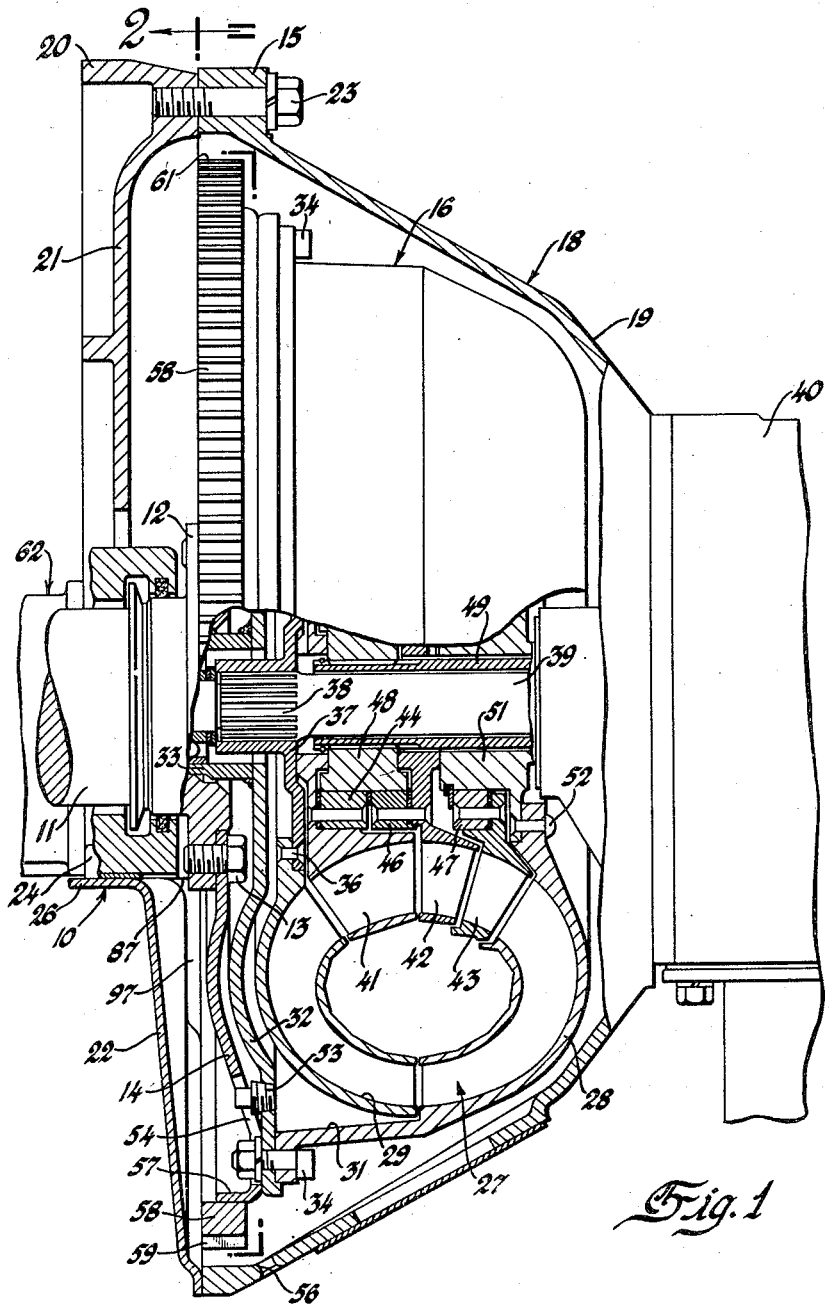
Figure 1 is a fragmentary view of an engine having a fluid flywheel and starter mechanism embracing the principles of the invention. The structure is shown in side elevation with various parts thereof broken away and shown in section to better illustrate the various features of the invention.
Figure 2:
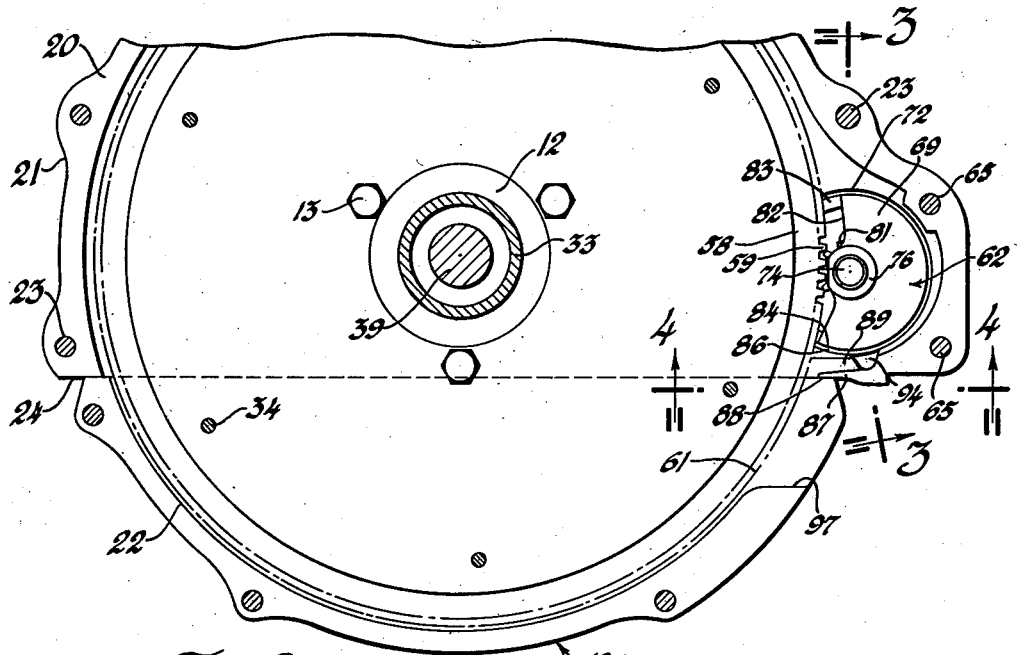
Figure 2 is a vertical cross sectional view through the structure illustrated by Figure 1 and is taken substantially in the plane of line 2—2 on Figure 1, looking in the direction of the arrows.
Figure 3:
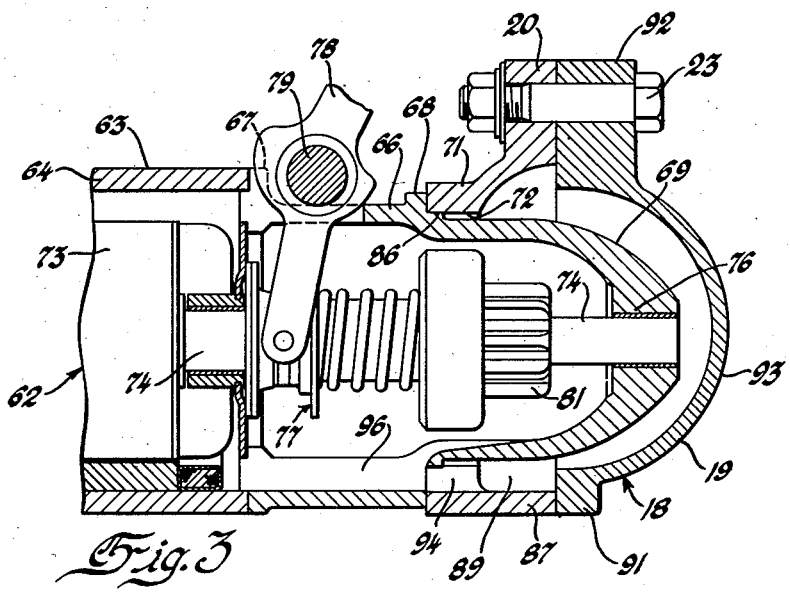
Figure 3 is a fragmentary cross sectional view of the structure shown by Figures 1 and 2.

Referring particularly to Figure 1, the numeral 10 indicates generally an engine having a crankshaft 11 projecting through and supported by the rear main bearing of the engine and terminating in a flange 12. The flange 12 is secured by screws 13 to the inner peripheral edge of an annular driving plate indicated at 14. The driving plate 14 supports and forms a part of a rotatable member 16 which in the present instance comprises a fluid flywheel and clutch member through which the power of the engine 10 is applied for any desired purpose. The rotatable member 16 has a casing or housing 18 which in the present instance consists of a rear bell shape cover or part 19, an upper front cover or part 21 and a lower front cover or part 22. The part 21 may be formed in such a way as to provide an adaptor plate for securing the housing 18 to the engine 10 or it may be formed as an integral part of the rear wall of the engine 10. The parts 19 and 21 are secured together at the flanged edges 15 and 20 thereof by screws indicated at 23. Part 21 has a flange 24 formed along the lower edge thereof and to which the upper flanged edge 26 of the part 22 is secured by screws or other suitable means not shown. The adjacent edges of all of the parts 19, 21 and 22 are suitably flanged where the edges thereof engage one another and may be gasketed if desired to provide a reasonably effective seal against the entrance of water, sand, or other fluids or substances which it is not desired to have admitted to the interior of the housing 18.

The rotatable member 16 may be of any desired construction but as shown in Figures 1–5 the member comprises a fluid flywheel or clutch 27 which consists of a driving member 28 and a driven member 29, the driving member being extended at 31 to surround the driven member 29. The member 28 is closed by a front plate 32 having a collar 33 adapted to be secured in fluid tight relation in an opening projecting within the central part of the flanged collar 12. The driving member 28 also is secured rigidly to the peripheral edge of the driving disc 14 by screws indicated at 34. The driven member 29 of the fluid flywheel or clutch 27 is secured by rivets 36 to the outer edge of a flanged collar 37 which is internally splined in such a way as to mesh with the externally splined end 38 of the driven shaft 39 through which the power from the engine 10 is transmitted to the transmission unit 40 when the clutch 27 is operated for such purposes. Stators 41, 42 and 43 are mounted between the inner parts of the driving member 28 and driven member 29 of the fluid drive device 27 and are operable at various speeds therebetween on bearing rings 44, 46 and 47 respectively. The bearing rings 44 and 46 are rotatably supported on a bearing member 48 which is secured rigidly to the rear end of the housing 19 upon sleeve 49 surrounding the shaft 39. The bearing ring 47 is rotatably supported on a hub member 51 which is secured to and forms a part of the driving member 28. Rivets 52 provide means for securing the two parts together.

The space within the fluid flywheel drive or clutch member 16 is filled with oil and in operation the driving member 28 acts as a pump for driving the driven member 29 as a turbine, the stators 41, 42 and 43 being reaction members that operate between the two. The enclosure formed within the driving member 28 and the plate 32 may be filled or drained by means of a threaded plug 53 which closes an opening formed in the plate 32. The plug 53 is accessible through an opening 54 which is formed in the driving plate 14 of the structure.

The space between the rotating member 16 and the casing 18 is formed in such a way as to provide a considerable clearance space for the rotation of the member 16 within the casing 18 and fluid in the form of liquid or gas or a mist formed by liquid and gas is adapted to fill this space with the heavier liquid normally accumulating within the lower part of the casing or housing 18. Such fluids accumulating within the casing 18 may leak from the interior of the rotating member 16, from the bearings for the shafts 11 and 39 leading to and from the rotatable member 16, from the engine 10 and from the transmission 40. Such fluids also may accumulate within the casing 18 from various external sources through joints between the various parts of the casing and through drain and other openings. The liquid in such fluids normally collects in the lower part of the casing 18 and may be drained therefrom through an opening 56 which may be provided in the lower part of the casing. The opening 56 may be employed or it may be dispensed with if this is desired. The reason the opening 56 may be dispensed with is that while it does tend quickly to drain accumulated liquid from the casing 16 it also tends to admit water which may be splashed or which may surround the casing 18 and for this reason additional means is provided for moving accumulated liquids from the casing 16.

In order to start the engine 10 auxiliary means for rotating the rotatable member 16 is provided. For this purpose the driving plate 14 is circumferentially flanged at the periphery thereof as is indicated at 57 and the exterior surface of the flange 57 extends within and is rigidly secured to a ring gear indicated at 58. The teeth 59 of the ring gear 58 provide axially disposed serrations within the annular exterior surface 61 of the ring gear 58. The annular exterior surface of the ring gear is a surface revolution about the axis of rotation of the rotatable member 16 with axially disposed serrations formed therein by the teeth 59.

It will be apparent that the entire surface of the rotatable member 16 including the peripheral surface of revolution 61 formed by the ends of the teeth 59 of the ring gear 58 will tend to rotate the fluid within the clearance space between the rotatable member 16 and the casing 18. It will also be apparent that the rotating surfaces of the member 16 also will frictionally entrain and rotate any liquid that may accumulate within the bottom of the casing 18 to a level great enough that the surface of the liquid will be engaged by any part of the rotating surface. Since in the present instance the diameter of the exterior surface of revolution 61 which is formed by the ends of the teeth 59 of the gear 58 is greater in diameter than any other part of the rotatable member 16, the surface 61 will engage the surface of any liquid within the lower part of the casing 18 before such liquid will be engaged by any other part of the rotatable surface of the member 16. In the event liquid does not accumulate in the lower part of the casing 18 at too great a rate, the exterior surface 61 of the gear 58 will tend frictionally to engage and to rotate liquid accumulating within the lower part of the casing 18 to such an extent that liquid may not rise in the casing 18 above the level of the lower extremity of the gear 58.

The member 16 is adapted to be rotatably driven for starting the engine 10 by a starter indicated at 62. The starter 62 may be any kind of starter although in the present instance an electric starter is illustrated. The starter 62 comprises a casing 63 formed by casing sections 64 and 66 which are secured rigidly together at a flange 67 formed outwardly from the casing section 66. The casing section 66 is of reduced diameter compared to the diameter of the casing section 64. The casing section 66 also has a flange 68 formed outwardly intermediate the ends thereof and beyond which the casing section 63 is provided with a reduced end indicated at 69. The reduced end 69 beyond the flange 68 provides an annular shoulder or groove in which a flange 71 formed around an opening 72 in the flywheel housing 18 is adapted to be seated. The reduced end 69 of the casing 66 projects through the opening 72 and into the housing 18 adjacent the peripheral edge of the housing 18. The opening 72 is located at one side of the casing 16 and in the front wall 21 of the casing 18 and about halfway between the upper and lower extremities of the casing 18. The casing 63 may be secured to the casing 18 with the flanges 68 and 71 in abutting relation to one another by bolts, some of which are indicated at 65.

The starter 62 is provided with a starter motor 73 having a driven shaft 74, the outer end of which is supported in an outboard bearing 76 located at the end of the reduced end 69 of the casing 63. The shaft 74 supports a conventional starter gear indicated generally at 77 which is operated by a suitable lever 78 supported on a pin 79 which is rigidly secured at the opposite ends thereof to supports projecting from the starter casing 63. Operation of the lever 78 tends to actuate the starter motor 73 for the purpose of driving the shaft 74 for starting the engine 10. The end of the shaft 74 within the outboard bearing 76 is provided with a starter pinion 81 which is adapted to mesh with the ring gear 58 for driving the ring gear to start the engine 10. In order to permit the meshing of the pinion 81 and the ring gear 58 the reduced end 69 of the casing 63 is provided with an opening 82 through which the ring gear 58 projects into a position to be engaged by the starter pinion 81. The opening 82 is formed to cut away one side of the reduced end 69 of the starter casing 63 in such a way that the inner circumferential edge 83 of the opening will extend along and in parallel relation to the front side of the ring gear 58. The lower circumferential edge 84 of the opening 82 extends in closely spaced relation to the outer surface of rotation 61 of the ring gear 58. The edge 84 provides an abutment, stop or tongue 86, the edge 84 of which extends in parallel relation to the surface of rotation 61 of the ring gear 58 and terminates closely enough thereto to interrupt or stop the rotation of fluid within the clearance space in the casing 18 that lies radially outwardly with respect to the surface 61 of the ring gear 58. Such rotation of fluid with the ring gear 58 will be interrupted by the outer and lower surface of the stop 86 at the reduced end 69 of the casing 63 which extends outwardly from the edge 84 of the opening 82. Below the stop 86 the housing 18 is formed in such a way as to provide a horizontally disposed shelf or ledge 87 having an edge 88 formed in parallel relation to the surface 61 of the ring gear 58 but somewhat farther away from the surface 61 than is the edge 84 of the stop 86. The space within the casing 18 which is above the ledge 87 and below the stop 86 forms a passage 89 which extends approximately radially outwardly from the peripheral surface 61 of the ring gear 58. As will best be seen by examining Figure 1, the ledge 87 projects laterally from the flange 24 forming the lower edge of the part 21 of the casing 18 and beyond the forward edge of the part 21 abuts the edge of flange 15 which is formed around the outer edge of the part 19 of the casing 18. The flange 15 is extended at 92 and 93 to provide a spherical end 93 and an extended flange 92 for receiving the outboard bearing end of the reduced end 69 of the casing 63. The inner end of the passage 89 terminates in a passage 94 that extends from one side thereof and which projects across the flange 71 of the part 21 of the casing 18. The opposite end of the passage 94 communicates with a groove 96 that is formed in the lower extremity of the casing part 66 and which extends longitudinally with respect to the casing 63 in such a way as to connect and to form a sump within the lower extremity of the casing 63.

It will be apparent that any liquid which enters the casing 63 from externally of the casing 63 will collect in the groove or sump 96 and will be drained into the casing 18 through passage 94, passage 89 and will fall by gravity in the casing 18 beyond the inner edge 88 of the shelf or ledge 87. If the engine is running it is possible that little of the liquid which is drained into the casing over the edge 88 of the ledge 87 may accumulate in the bottom of the casing 18. Most of such liquid will be blown out of the casing 18 through an exhaust passage 97 which is formed in the casing 18 between the upper edge of the cover 22 and the flange 91 of the cover 19 adjacent thereto and below and at one side of the lower flange 24 of the upper front cover 21. The slot 97 also is below the shelf 87 and is radially outwardly with respect to the one edge of the ring gear 58.

When the engine is running and the member 16 is rotating within the casing 18 the ring gear 58 will frictionally entrain any accumulated liquid in the bottom of the casing 18 the surface of which engages or closely approaches the lower extremity of the ring gear 58 and this liquid will be rotated with the ring gear 58 and member 16 around the inside of the casing 18 and toward the stop 86 formed on the reduced end 69 of the casing 63. Since the edge 84 of the stop 86 closely approaches the peripheral surface 61 of the ring gear 58 the fluid which is entrained by the ring gear 58 will be prevented from rotating beyond the stop 86 and since the slot 97 below the stop 86 forms the path of least resistance for exhausting this part of the casing 18 the fluid will be centrifugally projected through the slot 97. Since the passage 89 discharges into the region within the casing 18 being exhausted through the passage 97, it is apparent that most of the liquid discharged over the edge of the ledge 87 will be immediately exhausted through the passage 97. In any event, such liquid will eventually be exhausted through the passage 97 because if it is not immediately discharged through the passage 97 it will then flow by gravity into the lower extremity of the casing 18 from which eventually it may be pumped by operation of the centrifugal pump provided by the novel features of construction of the rotating member 16 and the housings or casings 18 and 63.

If the casing 18 is not provided with an opening such as that indicated at 56 then all of the liquid which may leak from the rotating member 16 or from the bearings for the shafts 11 and 39 and any water or other matter which may drain into the casing 18 from the casing 63 or may leak through openings at the edges of the parts of the casing, will be pumped from the casing by rotation of the ring gear 58. Such liquid will rise to the level of the lower part of ring gear 58 where it will be picked up by frictional engagement with the edge 61 of the ring gear and will be rotated with the ring gear until the rotational movement thereof is interrupted by the shelf or ledge 86. The obstruction so provided by the shelf or ledge 86 will cause an accumulation of fluid adjacent the opening 97 and through which it will be exhausted by the centrifugal effect resulting from the rotation of the ring gear 58 and the remaining surface of the member 16. If the opening 56 is provided in the casing 18 then the liquid which accumulates in the bottom of the casing 18 normally will be drained from the casing through the openings 56. However, if the engine is operated under such circumstances that water enters the opening 56 at an excessive rate then the ring gear will pump the liquid out through the exhaust passage 97.

Figure 5 illustrates the invention as applied to an engine having a friction clutch driven transmission indicated at 140. In Figure 5 the engine shaft 11 has a flanged end 12 supporting a flywheel or disc shaped driving member 101 on the peripheral edge of which is secured a ring gear 102. The ring gear 102 is similar to the ring gear 58 disclosed by Figures 1 and 2 and has the same reference numerals applied to similar structural features thereof. The rear end surface of the flywheel 101 has secured thereto by studs indicated at 103 a flanged annular casing indicated at 104. The casing 104 houses springs 106 and 107 and levers 108 adapted to operate the movable plate 109 of a friction clutch member indicated at 111. The friction disc 112 of the clutch member 111 has friction rings 113 and 114 secured thereto which are adapted operatively to engage the adjacent plane annular surfaces of the flywheel 101 and the movable clutch member 109 for the purpose of delivering the power of the engine to the transmission 140. The flywheel 101 and the clutch 111 comprise a rotatable member 216 similar to that indicated at 16 in Figures 1 and 2. The rotatable member 216 has a housing 118 consisting of an upper bell shaped member 119 having a front wall indicated at 121. The lower part of the member 119 is provided with flanges indicated at 120 and to which are secured a lower housing member indicated at 122. The front wall 121 of the housing member 119 is provided with an opening for receiving the reduced end of a casing similar to the opening 72 which receives the starter casing 63 illustrated by Figure 3. The starter casing 63 contains a starter mechanism including a starter gear 77 and starter pinion 81, the latter of which meshes with the ring gear 102 for the purpose of rotating the rotatable member 216 for starting the engine. The passage 89 in the starter mechanism 62 employed with the structure disclosed by Figure 5 drains into the interior of the casing 118 in the same manner as is illustrated in the preceding figures and the casing member 119 is provided with a ledge similar to the ledge 87 and a passage 86 for the purpose previously described. It is particularly important in the structure illustrated by Figure 5 not to have any water or oil or other foreign matter accumulate to any great extent within the bottom of the casing 118 because such accumulation might cause a mist in the casing 118 which would collect upon the plates 113 and 114 of the clutch 111 and injure the clutch and destroy its usefulness. The casing member 122 therefore may be provided with an outlet indicated at 124 for the purpose of continuously draining the casing 118 although it may be desirable under some circumstances to eliminate the outlet 124 where the vehicle is subject to operation in water or where large amounts of water may be splashed into the casing 118 through the opening 124. The housing member 122 also is provided with a circumferentially extending slot or exhaust passage indicated at 126. This passage is located radially outwardly with respect to the ring gear 102 and below the shelf 87 formed in the casing member 119 and below the reduced end of the starter housing 63 which projects into the casing member 119. The rotation of the rotatable flywheel and clutch member 116 will cause the ring gear 102 to pick up and to rotate any liquid with which it may come into contact within the casing 118 and since this rotation of fluid will be interrupted by the edge 84 of the stop 86, the fluid will be forced to flow outwardly through the slot 126 in the housing member 122 in the same manner as has been described in connection with the structure shown by the preceding figures.

I claim:

1. A driving mechanism for engines comprising a rotatable member having an outwardly disposed casing disposed thereon and providing operating clearance between said member and said casing, a ring gear associated with the periphery of said member for driving said member, an engine starter having a casing containing the mechanism thereof and providing clearance space around said mechanism and within said starter casing, one end of said starter casing being adapted to project within an opening in said member casing and being provided with an opening at one side of said end and within said member casing through which the driving pinion of said mechanism extends into engagement with said ring gear, and a passage formed in said casing and extending between the lower extremities of said starter casing and the interior of said member casing for draining fluid from the interior of said starter casing into said member casing.

2. A driving mechanism for engines comprising a rotatable flywheel and clutch member having a ring gear secured thereto adjacent the periphery thereof, a starter having a drive pinion operatively associated with said ring gear, housing means enclosing said starter and said member, said housing means for said starter being disposed above the lower extremity of said housing means for said member and at one side thereof, said housing means for said starter and said member being constructed to provide a passage leading from the lower extremity of said housing means for said starter to the interior of said housing means for said member, and a drain opening formed adjacent the lower extremity of said housing means for said member for draining fluid by gravity from the space within said housing means and surrounding said member.

3. A driving mechanism for engines comprising an engine starter having a starter mechanism including a pinion at one end thereof, a casing for said engine starter and having a flange and terminating in a reduced end beyond said flange, said reduced end being formed to provide an outboard bearing for said starter mechanism at one end of said casing, a clutch and flywheel housing having an opening therein for receiving said reduced end of said starter casing and engaging said flange around said reduced end, a flywheel and clutch member within said housing and having a ring gear secured thereto and projecting through an opening formed in said reduced end of said starter casing and into operative engagement with said starter pinion of said starter mechanism, said starter casing having a groove extending downwardly within the inner surface thereof and communicating with the lower extremities of all parts of the interior of said starter casing and having an end terminating beyond said starter casing flange, said flywheel and clutch housing having a passage therein forming a continuation of said groove and providing communication between said groove and the interior of said flywheel and clutch housing for draining liquid accumulating in said starter casing to the interior of said flywheel and clutch housing.

4. A driving mechanism for engines comprising an engine starter having a mechanism including a pinion at one end thereof, a casing having an annular shoulder adjacent one end thereof for said starter, a rotatable member driven by said engine and said starter and disposed with the axis of rotation thereof in parallel relation to the axis of rotation of said starter, a housing for said member and having an opening in a wall thereof for receiving the end of said starter casing and having said starter casing secured thereto against said annular shoulder, a ring gear secured to said member to be operatively engaged by said pinion through an opening formed in the side of said casing, said end of said casing within said housing having an edge formed by said opening, said edge being below said pinion and aligned with the axis of said pinion and said member and terminating in closely spaced relation to the peripheral edge of said ring gear, an outwardly directed passage formed in said housing beyond said peripheral edge of said ring gear and below said end of said casing, said casing being provided with drain means communicating with the lower part of said casing and terminating in communication with the outer end of said passage, said housing being also formed to provide a second outwardly directed passage below said edge and said first mentioned passage and extending outwardly to the atmosphere from said peripheral edge of said ring gear.

5. A driving mechanism for engines comprising a rotatable member, a housing for said member, said housing being spaced from said member except at the bearings for said member to provide an end and a peripheral clearance chamber extending around the greater part of the exterior surface of said member, said clearance chamber being in open communication with the atmosphere through axially disposed and other openings formed in said housing and being subject to being filled through said openings with air sometimes contaminated with water and other undesirable fluid substances, said member being disposed in said housing to rotate in said air and normally to be substantially free of said other fluid substances, an exhaust passage formed in said housing at one side of said housing and beyond the lower part of said clearance chamber and in the direction of rotation of said member and leading therefrom to the atmosphere surrounding said housing, centrifugal pump means formed by said member and said housing for separating said other fluid substances from said air and for pumping said other fluid substances from the lower part of said clearance chamber and through said exhaust passage leading from said housing, a driven member associated with said rotatable member and extending from said housing, and means associated with said rotatable member for selectively driving said driven member from said engine.

References Cited in the file of this patent

UNITED STATES PATENTS

| 1,277,178 | Bernhard | Aug. 27, 1918 |
| 1,393,875 | Woodworth | Oct. 18, 1921 |
| 1,629,340 | Hungate | May 17, 1927 |
| 1,689,579 | Burke | Oct. 30, 1928 |
| 1,753,825 | Ford | Apr. 8, 1930 |
| 1,865,504 | Bird | July 5, 1932 |
| 1,893,616 | Ferguson | Jan. 10, 1933 |
| 1,969,881 | Gardner | Aug. 14, 1934 |
| 1,972,548 | Brady | Sept. 4, 1934 |
| 2,220,538 | Neibert | Nov. 5, 1940 |